United States Patent
Kelz

(10) Patent No.: US 11,931,219 B2
(45) Date of Patent: Mar. 19, 2024

(54) METHOD OF CHARGING A BATTERY AND A SYSTEM HAVING A DENTAL LIGHT IRRADIATION DEVICE AND A BATTERY CHARGING DEVICE

(71) Applicant: 3M INNOVATIVE PROPERTIES COMPANY, St. Paul, MN (US)

(72) Inventor: Ralf Kelz, Germering (DE)

(73) Assignee: 3M Innovative Properties Company, St. Paul, MN (US)

( * ) Notice: Subject to any disclaimer, the term of this patent is extended or adjusted under 35 U.S.C. 154(b) by 532 days.

(21) Appl. No.: 17/250,942

(22) PCT Filed: Oct. 15, 2019

(86) PCT No.: PCT/IB2019/058781
§ 371 (c)(1),
(2) Date: Mar. 31, 2021

(87) PCT Pub. No.: WO2020/079590
PCT Pub. Date: Apr. 23, 2020

(65) Prior Publication Data
US 2022/0015886 A1 Jan. 20, 2022

(30) Foreign Application Priority Data

Oct. 18, 2018 (EP) ..................................... 18201123

(51) Int. Cl.
*A61C 13/15* (2006.01)
*H02J 7/00* (2006.01)

(52) U.S. Cl.
CPC .......... *A61C 19/003* (2013.01); *H02J 7/0047* (2013.01); *H02J 7/00714* (2020.01)

(58) Field of Classification Search
CPC ... A61C 19/003; A61C 17/224; A61C 19/004; H02J 7/0047; H02J 7/00714
See application file for complete search history.

(56) References Cited

U.S. PATENT DOCUMENTS

| 4,829,225 | A |   | 5/1989 | Podrazhansky |
| 5,233,283 | A | * | 8/1993 | Kennedy .............. H05B 39/047 320/136 |

(Continued)

FOREIGN PATENT DOCUMENTS

| CN | 105932349 | 3/2018 |
| EP | 2680392 | 1/2014 |

(Continued)

OTHER PUBLICATIONS

Jossen, "Moderne Akkumulatoren Richtig Einsetzen Chapter 6.2—ISBN 978-3-7418-9259-2" 2006, (224-257).

(Continued)

*Primary Examiner* — Stacy Whitmore
(74) *Attorney, Agent, or Firm* — Kevin Weber

(57) ABSTRACT

A method of charging a battery of a dental light irradiation device has the steps of powering the battery at a first charging current and measuring a first terminal voltage of the battery; powering the battery at a different second charging current and measuring a second terminal voltage of the battery; calculating a battery source voltage; and powering off the battery as soon as the battery source voltage reaches or exceeds the threshold voltage.

11 Claims, 2 Drawing Sheets

(56) References Cited

U.S. PATENT DOCUMENTS

| | | |
|---|---|---|
| 5,256,957 A | 10/1993 | Wiesspeiner |
| 5,307,000 A | 4/1994 | Podrazhansky |
| 5,508,598 A | 4/1996 | Al-Abassy |
| 5,694,023 A | 12/1997 | Podrazhansky |
| 6,144,187 A | 11/2000 | Bryson |
| 6,337,560 B1 | 1/2002 | Kalogeropoulos |
| 6,366,056 B1 | 4/2002 | Podrazhansky |
| 7,339,354 B2 | 3/2008 | Sanpei |
| 7,777,452 B2 | 8/2010 | Nishiyama |
| 8,111,035 B2 | 2/2012 | Nishino |
| 8,179,101 B2 | 5/2012 | Umetsu |
| 8,237,412 B2 | 8/2012 | Johnson |
| 8,502,494 B2 | 8/2013 | Nieh |
| 9,142,994 B2 | 9/2015 | Berkowitz |
| 9,197,089 B2 | 11/2015 | Choe |
| 2004/0152038 A1 | 8/2004 | Kumagai |
| 2010/0156356 A1 | 6/2010 | Asakura |
| 2011/0109275 A1 | 5/2011 | Taniguchi |
| 2015/0100260 A1 | 4/2015 | Joe |
| 2017/0352926 A1 | 12/2017 | Kanomata |
| 2018/0145527 A1 | 5/2018 | Ravi |

FOREIGN PATENT DOCUMENTS

| | | |
|---|---|---|
| EP | 2848953 | 3/2015 |
| JP | H11-137574 | 5/1999 |
| JP | 2008-164417 | 7/2008 |
| WO | WO 2008-154960 | 12/2008 |

OTHER PUBLICATIONS

1507 Extended EP Search Report for EP18201123.9, dated Dec. 10, 2018, 2pgs.

International Search Report for PCT International Application No. PCT/IB2019/058781, dated Nov. 7, 2019, 4 pages.

\* cited by examiner

METHOD OF CHARGING A BATTERY AND A SYSTEM HAVING A DENTAL LIGHT IRRADIATION DEVICE AND A BATTERY CHARGING DEVICE

CROSS REFERENCE TO RELATED APPLICATIONS

This application is a national stage filing under 35 U.S.C. 371 of PCT/1132019/058781, filed Oct. 15, 2019, which claims the benefit of European Application No. 18201123.9 filed Oct. 18, 2018, the disclosure of which is incorporated by reference in its/their entirety herein.

FIELD OF THE INVENTION

The invention relates to method of charging a battery of a dental light irradiation device and a system that comprises a dental light irradiation device and a battery charging device for performing the method.

BACKGROUND ART

In the field of dentistry, a variety of handheld battery powered devices are used. For example, for hardening of light hardenable or light curable materials dental light polymerization devices are often used.

Light hardenable materials often include a polymerizable matrix material and filler materials including colorants and may initially be generally soft or flowable so that they can be applied in a desired location and shape. For example, for restoration of a tooth the dental material may be filled into a tooth cavity and shaped so that the restored tooth resembles a natural tooth. Once the desired shape has been formed, the material may be cured by exposing it to light of a desired wavelength. The light typically activates photoinitiators in the dental material that cause the matrix material to polymerize.

The use of dental materials that are hardenable by blue light of a wavelength of between about 450 and 500 nm (nanometers) has become common in dentistry. Accordingly, dental light polymerization devices used for hardening such dental materials typically emit light at such wavelengths. Such a dental light polymerization device is for example available from 3M Deutschland GmbH, Germany, under the trade designation Elipar™ S10.

It is a general requirement to provide a dental light polymerization device with a power source that is capable of powering the dental light polymerization device for a time period that is sufficiently long to harden all of the dental material used in at least one treatment of a patient. Therefore, battery powered dental light polymerization devices typically are equipped with a battery which capacity is high enough to allow a reliable operation over multiple treatments, for example as they occur over a full day in a dentist's practice.

Although existing dental light polymerization devices provide certain advantages there is still a desire to enable a further use in case a dental light polymerization device runs out of power during a day in a dentist's practice or during a dental treatment.

SUMMARY OF THE INVENTION

The invention relates to a method of charging a battery of a dental light irradiation device. The method comprises the steps of:

(a) powering the battery at a first charging current $I_1$ and simultaneously at least temporarily measuring a first terminal voltage $U_1$ of the battery;

(b) powering the battery at a different second charging current $I_2$ and simultaneously at least temporarily measuring a second terminal voltage $U_2$ of the battery;

(c) calculating a battery source voltage $U_{BAT}$ based on the formula:

$$U_{BAT} = \frac{U_1 \cdot I_2 - U_2 \cdot I_1}{I_2 - I_1}$$

and (d) repeating steps (a) to (c) while the battery source voltage $U_{BAT}$ is below a predetermined threshold voltage and powering off the battery as soon as the battery source voltage $U_{BAT}$ reaches or exceeds the threshold voltage.

The invention is advantageous in that it allows a quick and safe recharging of a battery of a dental light irradiation device. Further, the invention enables an implementation of a relatively simple and inexpensive battery charging device and/or dental light irradiation device including a battery charging device.

In a preferred embodiment the steps (a) and (b) are performed alternately. In particular the steps (a) and (b) are preferably performed periodically and timely adjacent relative to each other. The term "timely adjacent" thereby covers a delay between the end of step (a) and step (b), or between the end of step (b) and step (a), of less than 1 second, for example 1 millisecond to 100 milliseconds. The delay is preferably as short as possible. Preferably, the steps (a) and (b) are not (in particular never) performed at the same time.

In one embodiment the steps (a) and (b) are each performed for a duration of at least 1 second. The steps (a) and (b) may be further each performed for a duration within a range of 1 seconds to 30 seconds. Preferably the steps (a) and (b) are performed for the same duration.

In an embodiment the steps (a) and (b) comprise limiting the first charging current $I_1$ to a maximum first charging current $I_{1max}$ and limiting the second charging current $I_2$ to a different maximum second charging current $I_{2max}$. This avoids the charging at overcurrent and thus helps maximizing the safety during charging of the battery. The limitation of a current is well known in the art of electrical engineering. In one example the first and second charging current is limited by a so-called constant current source as referred to in the following.

In one embodiment the battery is based on at least one Lithium-ion cell. In this embodiment the maximum first and second charging current $I_{1max}$, $I_{2max}$ may each be within a range of 500 mA to 2 A. The maximum first charging current $I_{1max}$ may for example be 900 mA and the maximum second charging current $I_{2max}$ may for example be 1100 mA. Preferably, the average charging current (calculated from the first and the second charging current over time) corresponds to a nominal charging current as specified by the manufacturer or supplier of the battery. Thereby the average relates to several repetitions of the steps (a) and (b), preferably from the beginning of charging the battery to the end. The maximum first and second charging current $I_{1max}$, $I_{2max}$ may be adapted during charging the battery. For example, in case the average charging current differs from the nominal charging current at least one of the first and second charging current $I_{1max}$, $I_{2max}$ may be increased or reduced accordingly during charging of the battery.

In an embodiment the battery is based on one Lithium-ion cell. In this embodiment the threshold voltage is within a range of 4.15 V and 4.25 V.

The invention further relates to a system that comprising a battery charging device and a dental light irradiation device. The battery charging device is preferably configured for performing the method of the invention as defined herein. Further, the dental light irradiation device comprises a polymerization light source for emitting visible blue light.

For the purpose of the present specification the term "blue light" refers to light having a wavelength within the range of about 430 nm to 500 nm, preferably within a range of about 430 nm to 480 nm. Blue light preferably predominantly consists of light within a range of about 430 nm to 480 nm. The blue light may particularly not comprise light having a wavelength outside the range of about 430 nm to 480 nm at a substantial intensity or at all. In particular, blue light may have a first portion of light within a range of about 430 nm to 480 nm and preferably does not have a significant second light portion within a range of 570 nm and 590 nm, wherein the maximum intensity of the second portion of light is preferably less than 10% and more preferably less than 1% of the maximum intensity of the first portion of light. Further blue light may not have a significant third light portion within the spectrum of visible light outside the range of 430 nm and 480 nm and outside the range of 570 nm to 590 nm, wherein the maximum intensity of any third portion of light is preferably less than 25% and more preferably less than 20% of the maximum intensity of the first portion of light.

In an embodiment the system comprises a battery for powering the dental light irradiation device. The battery preferably comprises one or more lithium-ion cells (as specified herein).

In an embodiment the battery charging device comprises a constant current source for powering the battery at a first charging current $I_1$ or, alternatively, at a different second charging current $I_2$. The constant current source may be switchable, preferably electrically switchable between the first charging current $I_1$ and the second charging current $I_2$. However, it is possible to provide two constant current sources each providing one of the first and second charging current $I_1$, $I_2$.

In one embodiment the system further comprises a voltage measurement circuit for measuring a terminal voltage of the battery. The battery typically has a first and a second battery terminal, for example a negative pole and a positive pole, respectively. Further, the battery charging device preferably has a first and a second charging terminal for connection to the first and second battery terminal, respectively. In operation of the system the first and second charging terminal are electrically connected to the first and second battery terminal, respectively. The constant current source and the voltage measurement circuit are preferably implemented in an electric circuit. The electric circuit may comprise discrete electric components and/or integrated electric components, optionally being programmed or programmable. Basically, the electronic circuit provides a first and a second (electric) loop for selectively powering the battery via the first or second loop, respectively. The first and second loop may have a common first loop terminal. The first loop terminal may be selectively connectable to the first charging terminal via an on-off switch. Thus, the first loop terminal is connectable to the first battery terminal. Further, the first loop may have a second loop terminal. The second loop terminal is preferably connectable to the second charging terminal via a changeover switch. The second loop may further have a third loop terminal. Therefore, the second loop extends between the first and the third loop terminal. As mentioned the first loop terminal may be selectively connectable to the first charging terminal via an on-off switch. Further, the third loop terminal is preferably connectable to the second charging terminal via a changeover switch. Accordingly, the changeover switch is configured for selectively connecting the second loop terminal (of the first loop) and the second charging terminal or, alternatively, the third loop terminal (of the second loop) and the second charging terminal.

Further each of the first and second loop are configured so that they can be powered by the constant current source.

In one embodiment the battery charging device is integrated within the dental light irradiation device. In such an embodiment the dental light irradiation device may comprise contacts for connecting a power source for powering the charging device. Alternatively, or additionally, the dental light irradiation device may comprise a wireless charging interface. The wireless charging interface may be configured to transmit electric energy to the charging device in a contactless manner (for example via induction).

In a further embodiment the battery charging device is separate from the dental light irradiation device. The battery charging device may have a device receptacle for removably receiving the dental light irradiation device therein for charging. Further, the battery charging device may have a battery receptacle for removably receiving a spare battery therein for charging. The spare battery may be provided for exchange of a removable battery that is arranged or arrangeable within the dental light irradiation device.

DETAILED DESCRIPTION OF THE INVENTION

Figure 1:
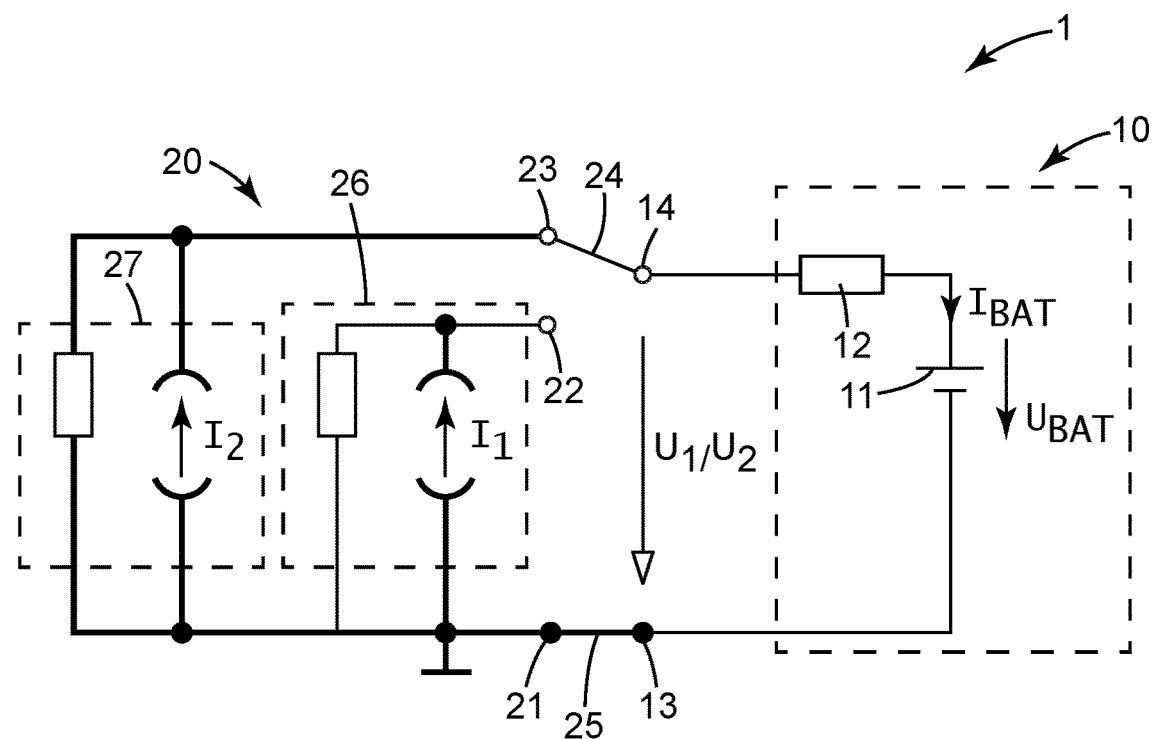
FIG. 1 is a circuit diagram of an electric circuit according to an embodiment of the invention.

FIG. 1 shows an exemplary wiring diagram of an electric circuit 1 as it may be implemented to put the method of the invention into practice. It is noted that the example represents one possibility of implementing the method of the invention and that the person skilled in the art will recognize alternative electric circuits, including for example integrated circuits and/or programmable circuits, which likewise or identically provide the features of the method of the invention.

The electric circuit 1 has a battery 10 and a power supply 20. In the example the battery 10 and the power supply 20 are electrically connected to each other. However, generally, the power supply 20 may be disconnectably connectable with the battery 10.

The battery 10 may for example be part of a dental device (as described in more detail below) and may be permanently or replaceably arranged in the device. The battery 10 comprises a single lithium-ion cell providing a nominal voltage of 3.7 V. An internal resistor 12 is illustrated for explanation. The skilled person will recognize that the internal resistor 12 is typically not provided in the form of a discrete additional electronic component but results from the configuration of the battery as such. The battery 10 may comprise further electric components, for example temperature monitoring circuitry and/or protective circuitry against overcurrent and/or overvoltage.

The power supply 20 comprises a first and an alternative second loop for selectively powering the battery via the first or second loop, respectively. The first and second loop have a common first loop terminal 21. Further, the first loop has a second loop terminal 22 and the second loop has a third loop terminal 23. A changeover switch 24 is provided for switching between the second and the third loop terminal 22, 23, and thus between the first and second loop respectively. An on-off switch 25 is provided for switching the charging of the battery 10 on or off. The on-off switch 25 in the example is connected to a first battery terminal 13 such that the first battery terminal 13 can be electrically connected to or, alternatively, disconnected from the first loop terminal 21 by means of the on-off switch 25. The changeover switch 24 is connected to a second battery terminal 14 such that the second battery terminal 14 can be electrically connected to the second loop terminal 22 or, alternatively, to the third loop terminal 23 by means of the changeover switch 24.

The electric circuit 1 is thus configured to perform a method of charging the battery 10. In particular, the battery 10 can be charged at a first charging current $I_1$. With the changeover switch 24 being set to connect the first loop and the battery 10 with each other (via the first and second battery terminals 13, 14) a first constant current source 26 powers the battery 10 at the first charging current $I_1$. The first constant current source 26 limits the first charging current $I_1$ to a maximum first charging current $I_{1max}$. While the battery 10 is powered at the first charging current $I_1$ a first terminal voltage $U_1$ of the battery 10 is measured between the first and second battery terminals 13, 14. The person skilled in the art will recognize that the actual relevant voltage in the charging of a battery typically is the source voltage. However, according to the invention a first terminal voltage $U_1$ (that likely differs from the source voltage) is measured during the battery 10 is powered.

The battery 10 is powered at the first charging current $I_1$ for a duration or time period that may be pre-determined or that may be user-determinable. Upon lapse of the time period the changeover switch 24 is set to connect the second loop and the battery 10 with each other (via the first and second battery terminals 13, 14). Setting the changeover switch 24 to connect the second loop and the battery 10 with each other causes the first loop and the battery 10 to be disconnected and setting the changeover switch 24 to connect the first loop and the battery 10 with each other causes the second loop and the battery 10 to be disconnected. At that stage a second constant current source 27 powers the battery 10 at a second charging current $I_2$ that is different from the first charging current $I_1$. Also, the second constant current source 27 limits the second charging current $I_2$ to a maximum second charging current $I_{2max}$. While the battery 10 is powered at the second charging current $I_2$ a second terminal voltage $U_2$ of the battery 10 is measured between the first and second battery terminals 13, 14.

The first and second terminal voltage $U_1$, $U_2$ may be each measured once while the battery 10 is powered, or the first and second terminal voltage $U_1$, $U_2$ may be each monitored over at least a part of the time period over which the battery 10 is powered and an average or maximum voltage may be assumed as the first and second terminal voltage $U_1$, $U_2$.

The steps of powering the battery 10 at the first charging current $I_1$ and powering the battery 10 at the second charging current $I_2$ are repeated until the battery 10 has been charged to the desired charge condition. To determine the charge condition a battery source voltage $U_{BAT}$ is calculated based on the measured first and second terminal voltage $U_1$, $U_2$ and the first and second charging current $I_1$, $I_2$. The battery source voltage $U_{BAT}$ is calculated based on the formula:

$$U_{BAT} = \frac{U_1 \cdot I_2 - U_2 \cdot I_1}{I_2 - I_1}$$

Once the battery source voltage $U_{BAT}$ has reached (or exceeded) a predetermined threshold voltage the battery is powered off. This means that once the battery source voltage $U_{BAT}$ has reached (or exceeded) the predetermined threshold voltage the on-off switch 25 is set to disconnect the common first loop terminal 12 from the first battery terminal 13. This causes the first and second loop to disconnect from the battery 10.

Although the electric circuit 1 is illustrated with discrete switches, resistors and other elements the method of the invention may be implemented on alternative hardware and/or software. In particular, desirably the electric circuit 1 is configured to automatically perform the method of the invention.

Figure 2:
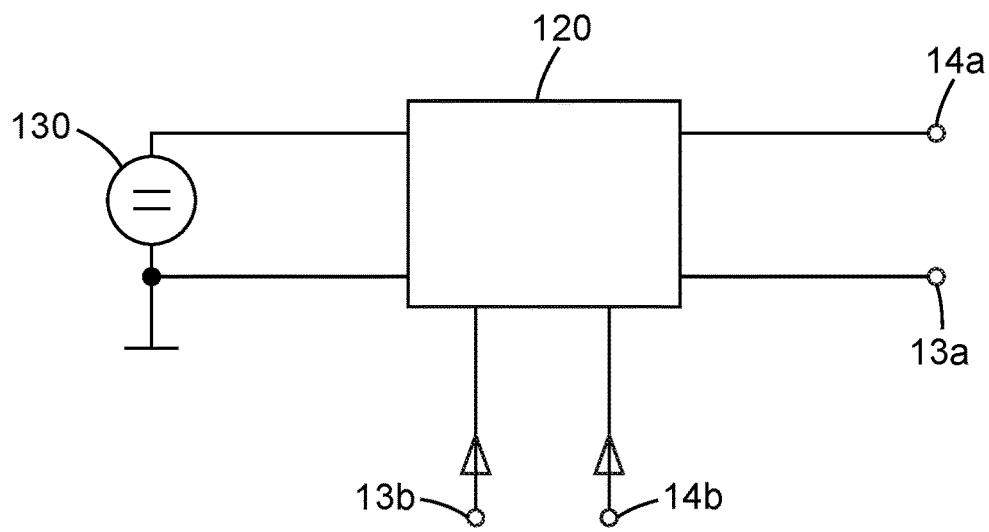
FIG. 2 is a circuit diagram of a further electric circuit according to an embodiment of the invention.

FIG. 2 outlines an electric circuit 1 that is based on a (preferably programmed and/or programmable) micro-controller 120. The micro-controller 120 is powered by a power source 130. Further, the micro-controller 120 has connectors 13a, 14a for powering the battery (not shown) and connectors 13b, 14b for measuring the first and second terminal voltage $U_1$, $U_2$ of the battery. The electric circuit 1 is configured to automatically perform the steps of alternately powering the battery at the first and second charging current $I_1$, $I_2$ until the battery 10 has been charged to the desired charge condition. The time period for which the battery is powered at the first or second charging current is preferably about 1 second or more, for example within a range of 1 second to 30 seconds. Thus, the powering at the first and second charging current $I_1$, $I_2$ is alternated at a low frequency. This helps minimizing the charging time because it takes some time for the battery to absorb energy after a charging power is applied so that less changes between the charging currents help increasing the charging speed.

Figure 3:
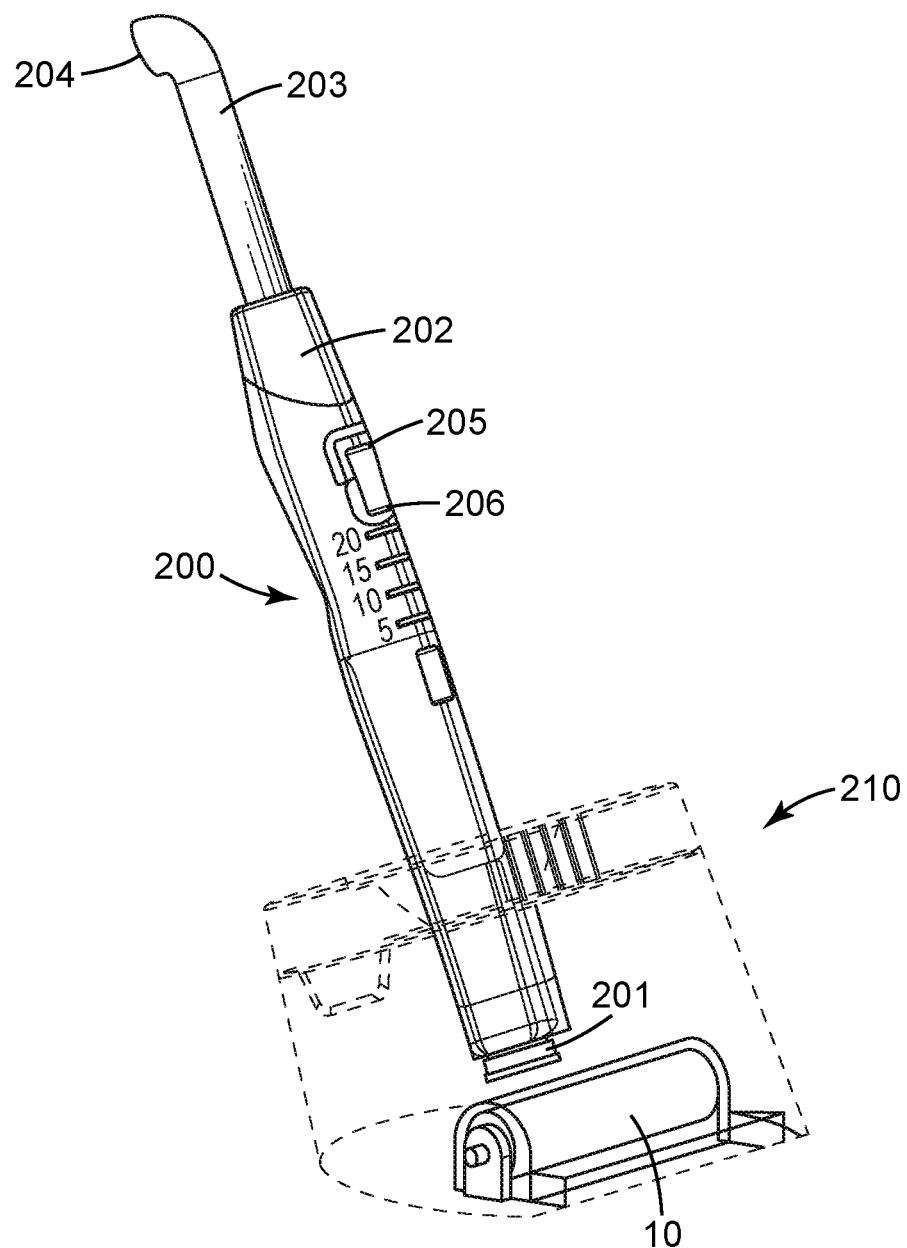
FIG. 3 is perspective view of a dental light irradiation device according to an embodiment of the invention.

FIG. 3 shows a dental light polymerization device 200. The dental light polymerization device 200 has a polymerization light source 202 (not visible in detail) for emitting blue light. The polymerization light source 202 comprises one or more blue LEDs (Light Emitting Diodes).

In the example, the polymerization light source 202 is accommodated within the dental light polymerization device 200. A light guide 203 is arranged at the dental light polymerization device 200 for guiding light emitted from the light source 202 toward a light output 204. Other configurations are possible. For example, the light source may be arranged directly or at a short distance behind the light output, or may form the light output.

The light polymerization device 1 in the example has a polymerization light button 205 and a timer setting button 206 integrated in one rocker switch. The polymerization light button 205 enables a user to activate the polymerization light source (for example for a duration which can be preset via the timer setting button 206) or to deactivate the polymerization light source.

The dental light polymerization device 200 in the example is an overall wireless device. The light polymerization device 200 contains a rechargeable battery (not visible).

Further, a rechargeable spare battery 10 is optionally arranged within a battery charging device 210. The spare battery 10 may be used for replacing the battery contained within the dental light polymerization device 200. For replacing the battery, the dental light polymerization device 200 has a removable closure 201. The closure 201 is configured for hermetically sealing a receptacle in which the battery can be received. In the example the closure 201 can be retained at the dental light polymerization device 200 by a screw or bayonet connection.

The battery charging device 210 in the example is configured for charging the spare battery 10 received within the battery charging device 210. Further, the battery charging device 210 may be configured for charging the battery contained within the dental light polymerization device 200 via a wireless charging interface (not shown). The wireless charging interface may comprise a coil for receiving electric energy by induction. An electronic circuit may convert this energy into a charging power. The electronic circuit may be additionally be configured as described in FIGS. 1 and 2, and thus may be configured for charging the battery contained within the dental light polymerization device 200 according to the method of the invention.

For charging the battery within the light polymerization device 200 the battery charging device 210 may be further connected or connectable by a contact-based electric connection.

The invention claimed is:

1. A method of charging a battery of a dental light irradiation device, comprising the steps of:
   (a) powering the battery at a first charging current $I_1$ and simultaneously at least temporarily measuring a first terminal voltage $U_1$ of the battery;
   (b) powering the battery at a different second charging current $I_2$ and simultaneously at least temporarily measuring a second terminal voltage $U_2$ of the battery;
   (c) calculating a battery source voltage $U_{BAT}$ based on the formula:

$$U_{BAT} = \frac{U_1 \cdot I_2 - U_2 \cdot I_1}{I_2 - I_1}$$

and
   (d) repeating steps (a) to (c) while the battery source voltage $U_{BAT}$ is below a predetermined threshold voltage, and powering off the battery as soon as the battery source voltage $U_{BAT}$ reaches or exceeds the threshold voltage.

2. The method of claim 1, wherein the steps (a) and (b) are performed alternately.

3. The method of claim 1, wherein the steps (a) and (b) are performed for a duration of at least 1 second.

4. The method of claim 1, wherein the steps (a) and (b) comprise limiting the first charging current $I_1$ to a maximum first charging current $I_{1max}$ and limiting the second charging current $I_2$ to a different maximum second charging current $I_{2max}$.

5. The method of claim 4, wherein the battery is based on one Lithium-ion cell with the maximum first and second charging current $I_{1max}$, $I_{2max}$ being each within a range of 500 mA to 2000 mA.

6. The method of claim 5, wherein the battery is based on one Lithium-ion cell and wherein the threshold voltage is within a range of 4.15 V and 4.25 V.

7. A system comprising a battery charging device being configured for performing the method of claim 1, and a dental light irradiation device, the system comprising a battery for powering the dental light irradiation device, wherein the dental light irradiation device comprises a polymerization light source for emitting visible blue light.

8. The system of claim 7, wherein the battery charging device comprises a constant current source for powering the battery at a first charging current $I_1$ or, alternatively, at a different second charging current $I_2$.

9. The system of claim 8, wherein the constant current source is electrically switchable between the first charging current $I_1$ and the second charging current $I_2$.

10. The system of claim 7, further comprising a voltage measurement circuit for measuring a terminal voltage of the battery.

11. The system of claim 7, wherein the battery charging device is integrated within the dental light irradiation device.

* * * * *